Oct. 28, 1958 C. E. HANSON, JR 2,857,894
CHECK VALVE
Filed May 17, 1954

Inventor
Clarence E. Hanson, Jr.
By S. C. Thorpe
Attorney

United States Patent Office 2,857,894
Patented Oct. 28, 1958

2,857,894

CHECK VALVE

Clarence E. Hanson, Jr., Grand Rapids, Mich., assignor to General Motors Corporation, Detroit, Mich., a corporation of Delaware Application May 17, 1954, Serial No. 430,341

10 Claims. (Cl. 123—90)

This invention relates to check valves for controlling and limiting flow of fluids in one direction through passages, and particularly to means for guiding movements of the check valve in operation and biasing it to the valve closed position.

In those installations wherein the passageway or chamber from which fluid flow is to be checked by the valve it must be of such dimension that its walls cannot serve to define the check valve operating movements, a separate perforated cage is commonly mounted therein having side walls surrounding the valve to restrict its lateral freedom of movement and having an end wall which limits the valve opening movement. In order to effect quick closing of the valve under relatively light back-flow pressure it is also common to insert a small biasing spring between the end wall of the cage and the check valve so as to resiliently urge the valve against its seat. Where the parts involved are relatively small a problem in efficient assembly handling exists, and although it is not broadly new to avoid this problem by providing a combined cage and biasing means for the check valve, it is believed the present invention accomplishes this result by a design of great simplicity and economy of manufacture with consequent advantages over prior known constructions.

In certain of its broader aspects, therefore, this invention has as an object to so form such a check valve cage as a generally cup-shaped element having perforate walls including a bottom wall with longitudinally spaced apart portions, one of which portions is adapted to engage and resiliently bias the valve closed and the other serves to limit movement of said first portion in the valve opening direction. Also, by reason of its novel design the cage may advantageously be bent up from a flat sheet metal stamping.

Although the invention is not limited in its application thereto, I have for purposes of illustration selected one preferred embodiment thereof which I will now describe with reference to the drawing wherein.

Figure 1:
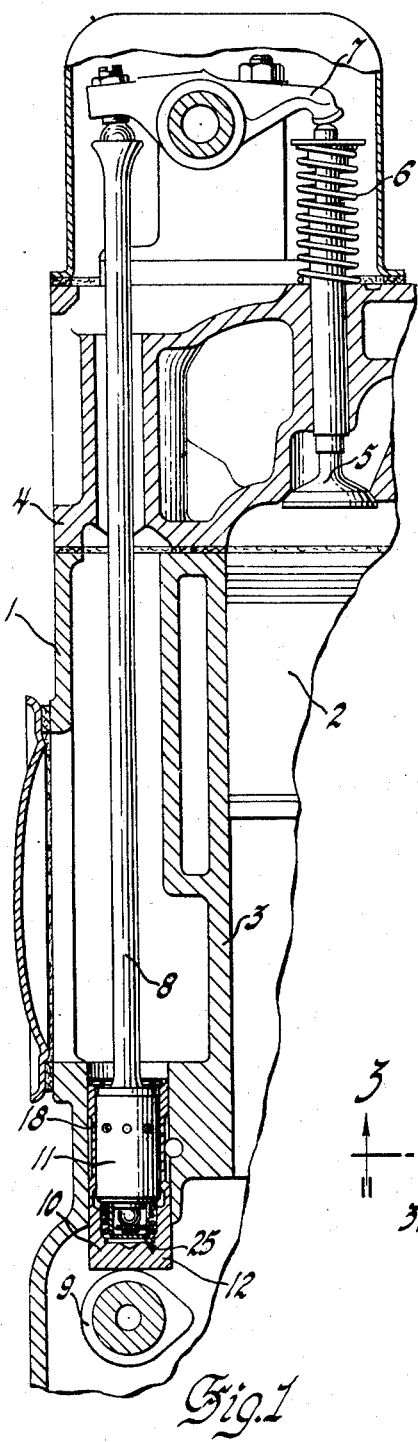
Figure 1 is a transverse sectional view through a portion of an internal combustion engine whose valve operating train includes a hydraulic valve lifter incorporating a combined check valve cage and biasing spring in accordance with the invention.

Referring now to the drawings in detail, in Figure 1 the engine is illustrated as having a cylinder block and crankcase 1 in which a power piston 2 operates in a cylinder 3. The numeral 4 designates the engine cylinder head in which is reciprocably mounted a poppet valve 5, biased to its closed position (shown) by a return spring 6 and movable in the opening direction by a cylinder head mounted valve rocker 7 in response to upward movement of a push rod 8 operatively connecting the push rod to an engine driven cam 9 through a hydraulic lash adjuster or valve lifter 10.

Figure 2:
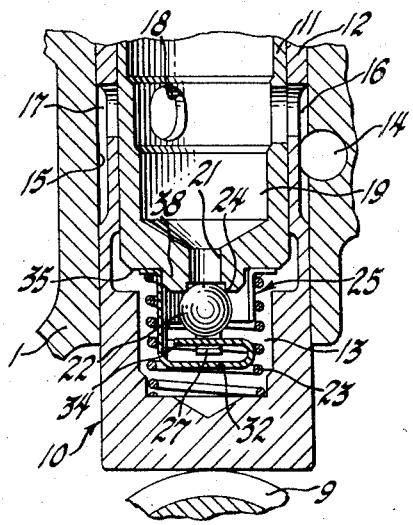
Figure 2 is an enlarged fragmentary view of the engine and hydraulic valve lifter of Figure 1, showing the parts in greater detail.

The valve lifter 10 as best shown in Figure 2 comprises a pair of telescopically slidable cup-shaped members 11 and 12. The outer member 12 has its bottom end resting on the operating surface of the cam 9 and forms a cylinder in which the inner member 11 constitutes a piston or plunger. Within the cylinder 12, below the plunger 11, is an oil cushion chamber 13 in which a body of incompressible fluid is contained. In the particular arrangement illustrated, this fluid is oil which is supplied from the engine lubricating system by an oil gallery 14 in the block communicating with the bore 15 therein in which the cylinder is slidably reciprocable. The oil delivered by the gallery 14 to the bore 15 passes through the side walls of the plunger and cylinder via the cylinder external groove 16 and cylinder and plunger ports 17 and 18, respectively, into the reservoir 19 formed by the hollow interior of the plunger 11. This supply of oil to the reservoir is for the purpose of replenishing that which is regularly lost during operation from the chamber 13 by leakage between the plunger and cylinder side walls with each lift stroke of the cam 9 in opening the engine valve 5. A passage 21 extending through the bottom of the cup-shaped plunger serves to connect the reservoir 19 and the cushion chamber 13 for this purpose, and to ensure against back-flow through this passage during the lift stroke there is provided a check valve in the form of a ball 22. A plunger spring 23 is also placed in the chamber 13 to effect re-lengthening of the lifter 10 between successive lift strokes of the cam 9. During each interval between lift strokes the engine valve 5 is closed and the plunger spring 23 acts against the plunger 11 to take up all clearance or lash between it and the engine valve, while causing the lifter cylinder 12 to remain in contact with the operating surface of the cam. In so doing, and immediately upon closing of the engine valve 5 the lifter cylinder moves downward toward the cam axis relative to the lifter plunger 11 and effects an enlargement of the oil cushion chamber 13, producing a consequent drop in pressure therein and unseating of the check valve 22. The seat for this check valve is indicated at 24 on the cushion chamber end of the plunger passage 21.

Figure 3:
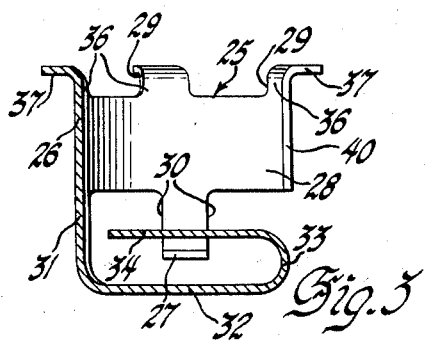
Figure 3 is a further enlarged view of the combined cage and spring shown removed from the valve lifter of Figures 1 and 2, the view being in section taken substantially on the line 3—3 of Figure 4.
Figure 4:
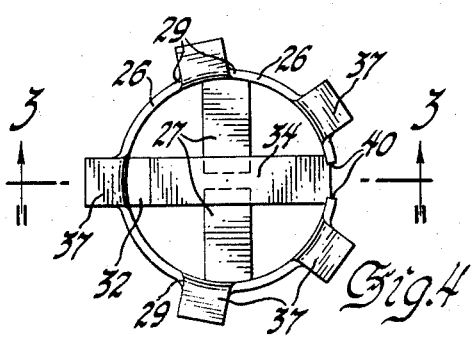
Figure 4 is an end elevational view of the cage and spring as viewed from above in Figure 3.

As the check valve 22 would otherwise have excessive freedom of movement within the cushion chamber when once unseated from the plunger 11, there is provided a valve retaining cage 25. This cage as best seen in Figures 3 and 4 is in the form of a skeleton-like cup-shaped member having side walls 26 and a bottom wall 27. For maximum lightness in weight and to provide ample openings therein for free flow of oil into and out of the cage 25, its side walls 26 are made in the form of an annular band portion 28 with circumferentially spaced cut-outs or notches 29 and 30 along its upper and lower margins, respectively. The bottom wall portions 27, as will be seen, constitute in-turned continuations of the lowermost side wall portions intermediate the notches 30. A somewhat similar side wall continuation portion 31 extends longitudinally below the portions 27 and thence turns inwardly in spaced relation thereunder as indicated at 32, to the diametrically opposite side of the cage at which it is provided with a reverse bend 33 and continues again substantially across the diameter of the cage to form a check valve spring member 34 which is normally spaced somewhat above the bottom wall portions 27. As means serving to retain the cage in position on the abutment surface 35 of the plunger surrounding the valve seat 24, the upwardly extending side wall portions 36 between the notches 29 are turned outwardly at their upper ends to provide flange portions 37. In its assembly in the valve lifter 10 these flange portions are clamped against the plunger abutment surface 35 by the plunger spring 23. At its inner extremities the plunger abutment surface 35 terminates in a shoulder formed by a reduced diameter section 38 of the plunger which extends a short distance inwardly of the cage 25 and serves to locate it laterally of the plunger axis.

The band portion 28 of the cage side walls 26 is preferably slit longitudinally at 40 intermediately of two of the flange portions 37 and opposite the side wall continuation 31. The purpose of this is to enable the combined cage and spring to be fabricated by pressing it into shape from a flat sheet metal stamping. Also, if desired, the diameter of the cage side walls may be selected to be slightly less than the plunger reduced end 38, thereby effecting a snug fit when in place thereon.

In operation, the check valve 22 is in engagement with the bottom wall spring portion 34 and is resiliently urged thereby against the check valve seat 24. During such times as the check valve is in open position, i. e., off its seat 24 during expansion of the oil cushion chamber 13, the spring portion 34 is deflected downward by the check valve in the direction of the bottom wall portions 27. These latter portions 27, being spaced a desired distance below the spring portion 34, serve as a stop to limit extreme opening movement of the check valve. The length of the spring portion 34 and the portion 32 supporting it through the reverse bend 33 is sufficiently great that the force of the biasing action on the check valve may be adjusted by bending those portions up or down relative to the cage side wall.

While only a single preferred embodiment of the invention has been disclosed, it is appreciated that numerous minor changes in the construction and arrangement of the parts may be made without departing from the spirit and scope of the invention as defined in the following claims.

I claim:

1. A combined cage and biasing means for a check valve, comprising a hollow element having walls providing an enclosure within which a check valve may move toward and away from its associated valve seat, one of said walls having a portion extending therefrom adapted to engage and resiliently urge the check valve toward its seat, one of said walls having a portion normally spaced from but engageable by said first named portion to limit movement of the valve away from its seat.

2. A combined cage and biasing means for a check valve, comprising a generally cup-shaped element having side and bottom walls providing an enclosure within which a check valve may move toward and away from its associated valve seat, said element having an outturned flange portion extending transversely of its side walls adapted to engage supporting means for said element, one of said walls having a portion extending therefrom adapted to engage and resiliently urge the check valve toward its seat, one of said walls having a portion normally spaced from but engageable by said second named portion to limit movement of the valve away from its seat.

3. A combined cage and biasing means for a check valve, comprising a generally cup-shaped element having side and bottom walls providing an enclosure within which a check valve may move toward and away from its associated valve seat, said element having an outturned flange portion extending transversely of its side walls adapted to engage supporting means for said element, one of said walls having a portion extending therefrom adapted to engage and resiliently urge the check valve toward its seat, said side walls being provided adjacent their ends nearest the bottom wall with circumferentially spaced openings through which the check valve controlled fluid may pass into and out of the enclosure formed by said side and bottom walls.

4. A combined cage and biasing means for a check valve, comprising a generally cup-shaped element having side and bottom walls providing an enclosure within which a check valve may move toward and away from its associated valve seat, said element having an outturned flange portion extending transversely of its side walls adapted to engage supporting means for said element, one of said walls having a portion extending therefrom adapted to engage and resiliently urge the check valve toward its seat, said side walls being provided adjacent their ends nearest the bottom wall with circumferentially spaced openings through which the check valve controlled fluid may pass into and out of the enclosure formed by said side and bottom walls, said bottom wall consisting of one or more transverse continuations of the side wall sections between said openings.

5. A combined cage and biasing means for a check valve, comprising a generally annular band having portions extending longitudinally and thence transversely inward of the axis thereof at one of its ends to form a cup with skeleton side and bottom walls, one of said portions being adapted to engage and resiliently urge the check valve toward the open end of the cup.

6. A combined cage and biasing means for a check valve, comprising a generally annular band having portions extending longitudinally and thence transversely inward of the axis thereof at one of its ends to form a cup with skeleton side and bottom walls, one of said portions being adapted to engage and resiliently urge the check valve toward the open end of the cup, the other of said portions extending transversely inward of the cup axis at a distance from the inward extension of said one portion to limit deflection of said one portion in response to opening movement of the check valve.

7. The invention defined in claim 6, wherein said band is longitudinally slit to enable the cup being bent up from a flat blank.

8. In a hydraulic valve lifter having a cylinder with a slidably fitted piston defining an oil cushion chamber and an oil reservoir therein above and below the piston, respectively, said piston having a passage for flow of oil from said reservoir to said chamber, a check valve adapted to prevent reverse flow through said passage, resilient means acting against said piston to urge its movement within the cylinder in the direction to enlarge said chamber, and a perforate cage enclosing said check valve, said cage having transversely extending portions clamped to the piston by said resilient means and urging the check valve closed, respectively.

9. In a hydraulic lash adjuster having two telescopically associated members in thrust transmitting relation with a body of fluid therebetween and a check valve controlling a passage in one of said members communicating with said body, a generally cup-shape perforate cage enclosing said check valve within said body, said cage having an external flange at its open end adapted to abut said passaged member, the bottom of said cage having an integral resilient portion extending interiorly therefrom engaging and urging the check valve closed when said flange is in abutment with said passaged member, and a coil compression spring encircling said cage having its opposite ends thrustably seated on said flange and the other of said members, respectively, whereby said flange is maintained in abutment with said passaged member and said check valve is urged closed.

10. In a check valve device, a member having a fluid passage terminating in a valve seat, a valve cake abutment surface on said member laterally disposed from said seat, a valve movable toward and away from said seat in response to difference in fluid pressure within the passage and externally of the member adjacent said seat, and a combined cage and biasing means enclosing said valve having side walls terminating at one end in a flange engaging said abutment surface and at the other end in in-turned portions below the valve, said in-turned portions being relatively movable and normally spaced from each other longitudinally of the side walls, said in-turned portion nearest the valve being engageable therewith and resiliently opposing its movement away from the valve seat.

References Cited in the file of this patent

UNITED STATES PATENTS

| | | |
|---|---|---|
| 2,250,752 | Dayton | July 29, 1941 |
| 2,667,149 | Purchas et al. | Jan. 26, 1954 |
| 2,761,435 | Oldberg | Sept. 5, 1956 |

FOREIGN PATENTS

| | | |
|---|---|---|
| 495,754 | Belgium | Sept. 16, 1950 |